United States Patent [19]

Allen et al.

(10) Patent No.: US 6,532,558 B1
(45) Date of Patent: Mar. 11, 2003

(54) MANUFACTURING TESTING OF HOT-PLUG CIRCUITS ON A COMPUTER BACKPLANE

(75) Inventors: Jonathan Michael Allen, Rochester, MN (US); Keith Ronald Halphide, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/518,230

(22) Filed: Mar. 2, 2000

(51) Int. Cl.[7] .............................................. H04B 17/00
(52) U.S. Cl. ...................................................... 714/724
(58) Field of Search .......................... 714/724, 46, 22, 714/36; 710/103, 316

(56) References Cited

U.S. PATENT DOCUMENTS 5,996,035 A  * 11/1999 Allen et al. ................. 710/103
6,035,355 A  *  3/2000 Kelley et al.
6,363,452 B1 *  3/2000 Lach
6,286,066 B1 * 10/2001 Hayes et al.
6,170,029 B1 *  1/2002 Kelley et al. ............... 710/103
6,182,173 B1 *  1/2002 Grosser et al.
6,185,642 B1 *  2/2002 Beukema et al.
6,296,491 B1 *  3/2002 Pickles
6,229,334 B1 *  5/2002 Kelley et al. ................. 326/30

* cited by examiner

Primary Examiner—Phung M. Chung
(74) Attorney, Agent, or Firm—James R. Nock

(57) ABSTRACT

A method and apparatus for analog testing of hot-plug circuits on an active computer backplane. A test connector is added to the computer backplane that enables an external tester to turn on each card slot present on the computer backplane. The external tester then directs a test adapter card residing in a selected card slot to apply a nominal and overcurrent load to each voltage level of the selected card slot. After each load has been applied, the corresponding voltage level is returned to the external tester. The external tester then measures the voltage level, and verifies that the voltage level falls within a predefined voltage range. The test connector uses existing unutilized bus signal lines to pass test directives and results between the card slot under test and the external tester. The same test adapter card that performs the analog test on a card slot is also used to perform digital testing on the card, thus reducing both testing time and the complexity of the testing apparatus.

24 Claims, 19 Drawing Sheets

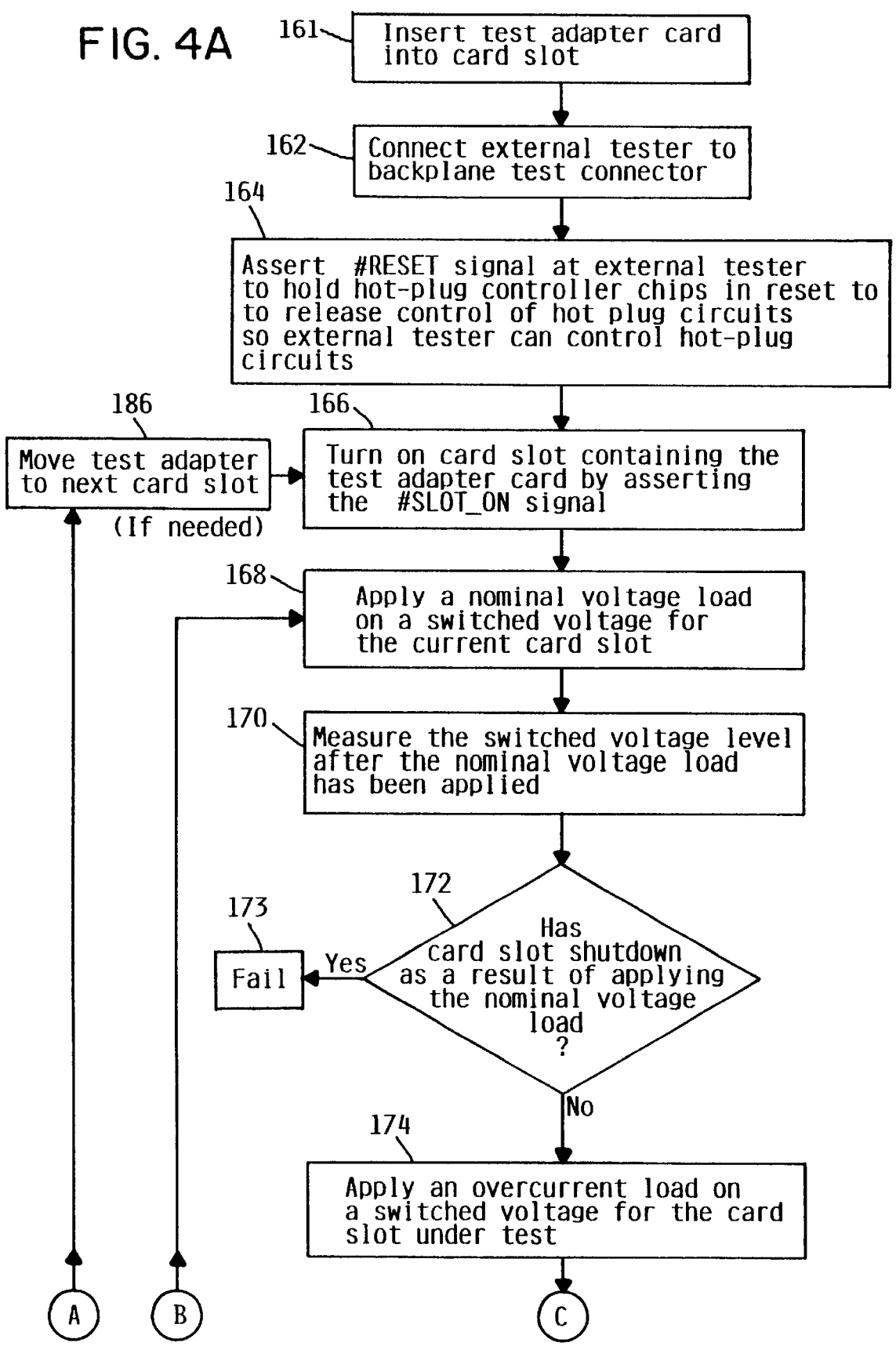

MANUFACTURING TESTING OF HOT-PLUG CIRCUITS ON A COMPUTER BACKPLANE

TECHNICAL FIELD

This invention relates generally to the testing of circuits on a computer backplane and more particularly relates to a method and apparatus to test hot-plug circuits corresponding to each slot on an active computer backplane.

BACKGROUND OF THE INVENTION

Internal computer components, such as processors, cache, memory, expansion cards and storage devices, communicate with each other over one or more busses. A bus, in computer terms, is a channel over which information flows between one or more devices. A bus normally has access points, or places into which a device interfaces in order to become part of the bus. Once a device interfaces with the bus, the device can send information to, and receive information from, other devices which are also interfaced to the bus.

Nearly all PCs made today include a local bus for data that requires especially fast transfer speeds, such as video data. The local bus is a high-speed pathway that connects peripherals (e.g., video cards, sound cards, modems, etc.) directly to the processor. Currently, the most popular local bus is the Peripheral Component Interconnect (PCI) bus, which was developed by Intel Corporation, and introduced in 1993.

One of the most important advancements in the PCI bus in recent years is the addition of hot plug technology. Hot plugging is generally defined as the ability to add and remove devices to a computer while the computer is running and where the operating system automatically recognizes the change. The PCI Special Interest Group has developed an open, industry standard that enables multiple system providers, operating system developers, and adapter suppliers to implement PCI hot-plug solutions. Unlike older bus architectures, PCI hot-plug technology allows a PCI adapter to be added, removed or replaced while the host system is running and while other adapters in the computer system provide uninterrupted service. As a result, PCI hot-plug technology significantly reduces unplanned system downtime. In the past, reliable and powerful around-the-clock performance was available only from expensive, proprietary systems.

A major challenge for manufacturers of PCI backplanes that support hot-plug circuits is the functional testing of the PCI hot-plug circuits themselves (i.e., whether the hot-plug circuits power-up/power-down the associated adapter slot properly). Hot-plug circuits are not fully testable by a standard backplane manufacturer's in-circuit-test (ICT) because the sense resistors in the hot-plug circuit are of too low of a resistance to differentiate from a short. As a result, testing of the hot-plug circuits would have to be performed by two separate test adapter cards (i.e., an analog card for analog testing, and a digital card for digital testing) that are placed in a PCI slot corresponding to the hot-plug circuit under test. This effectively doubles the time the backplane resides at a testing station, and greatly increases the cost and complexity of the backplane testing mechanism.

Thus, there is a need for a quick, cost-effective method and apparatus for testing PCI hot-plug circuits on an active PCI backplane of a computer system after manufacture. The method and apparatus should allow an analog test to be performed by the same manufacturer's test adapter that performs digital PCI testing of the slot, thus reducing the time the backplane resides at the test fixture. The method and apparatus should also improve development testing of PCI hot-plug circuits on a PCI backplane, enabling detailed laboratory measurements to be taken directly from the PCI backplane via an external test connector.

These and other objects, features and advantages of the present invention will be further described and more readily apparent from the summary, detailed description and preferred embodiments, the drawing and the claims which follow.

SUMMARY OF THE INVENTION

The present invention provides an apparatus and method for testing hot-plug circuits on a computer backplane. In a preferred embodiment, a test connector on each backplane routes signals to/from an external tester to the backplane, and more specifically, to the hot-plug circuits that control power supplied to each of the card slots mounted on the computer backplane.

The test connector enables an external tester to turn on each card slot present on the computer backplane. The external tester then directs a test adapter card residing in a selected card slot to apply a nominal and overcurrent load to each voltage level of the selected card slot. After each load has been applied, the corresponding voltage level is returned to the external tester. The external tester then measures the voltage level, and verifies that the voltage level falls within a predefined voltage range. The test connector uses existing unutilized bus signal lines to pass test directives and results between the card slot under test and the external tester. The same test adapter card that performs the analog test on a card slot is also used to perform digital testing on the card, thus reducing both testing time and the complexity of the testing apparatus.

The present invention offers several advantages over current methods of testing hot-plug circuits. The preferred embodiment allows analog testing of the hot-plug circuits to be performed by the same test adapter that performs digital testing, cutting potential testing time in half. Since a single test adapter card can be used for both the analog and digital tests, the complexity of the fixture required to perform the circuit testing is reduced. Finally, the preferred embodiment provides improved development testing of hot-plug circuits, since detailed laboratory measurements can be obtained quickly and easily via the test connector.

DETAILED DESCRIPTION OF THE INVENTION

Figure 1:
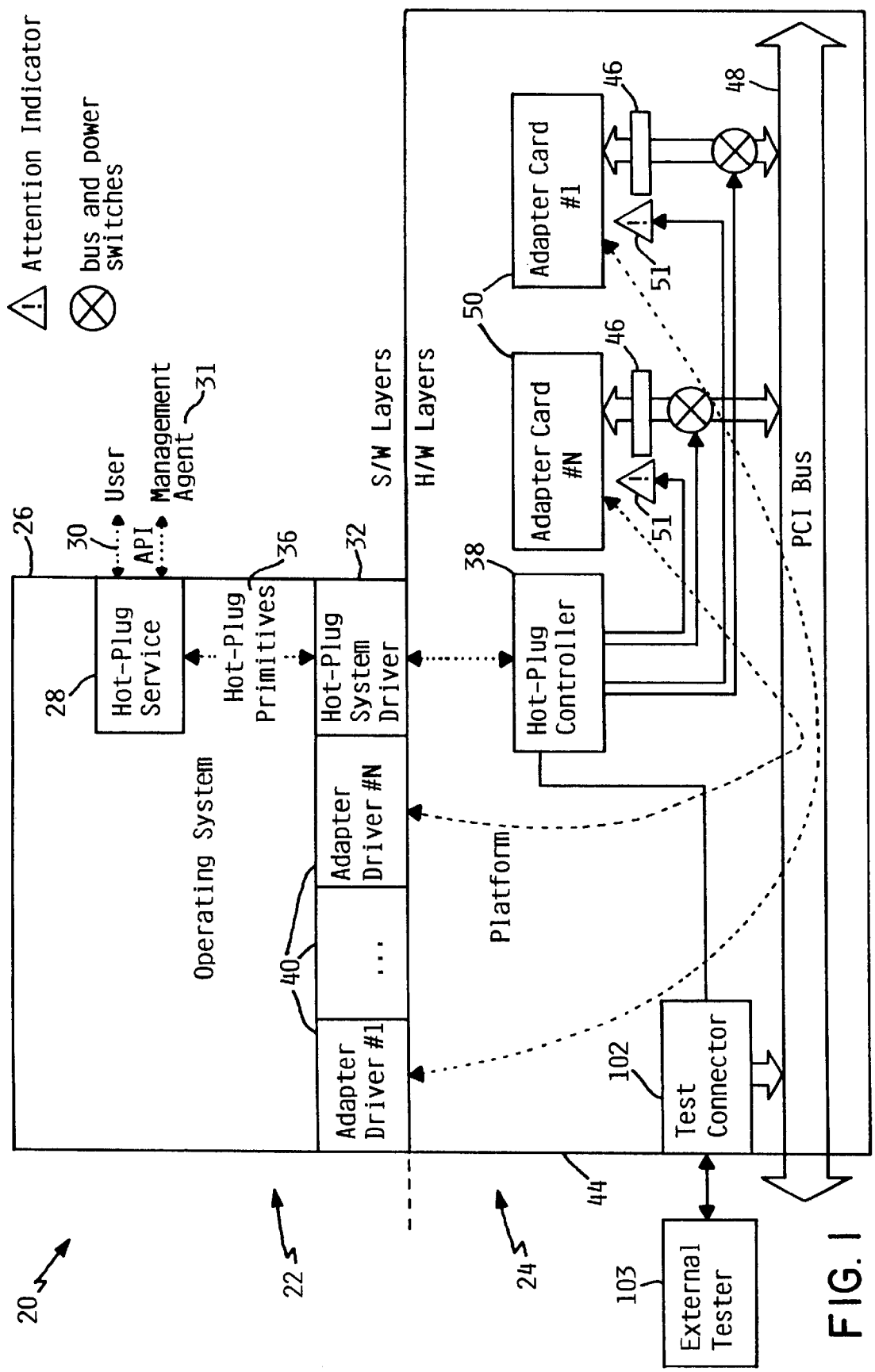
FIG. 1 is a high-level functional block diagram illustrating the hardware and software components of a hot-plug computer system in accordance with the preferred embodiment.

FIG. 1 is a high level functional block diagram illustrating the basic components of a computer system 20 incorporating hot-plug circuits. As previously defined, a hot-plug circuit enables a user to add and remove devices to a computer while the computer is running and have the operating system automatically recognize the change. In a preferred embodiment, computer system 20 utilizes a Peripheral Component Interconnect (PCI) bus, which complies with PCI Hot-plug Specification Revision 1.0, developed by the PCI Special Interest Group, hereby incorporated by reference. However, other types of backplanes which incorporate the general concepts of hot-plug circuits are also supported within the scope of the present invention.

In the illustrated embodiment, computer system 20 includes at least one software layer 22 and at least one hardware layer 24. Included within software layer 22 is an operating system 26, which includes a hot-plug service 28. Hot-plug service 28 is high-level software that has overall control of hot-plug operations. Operating system 26 also includes a hot-plug system driver 32, which controls and monitors hot-plug controller 38 (described in detail below). Hot-plug service 28 issues requests (also known as hot-plug primitives 36) to hot-plug system driver 32 to turn adapter card slots on and off. Hot-plug service 28 can also issue requests to the operating system to quiesce adapter activity (i.e., when adapter activity is quiesced, an adapter driver 40 does not send any operations to an adapter card 50, and adapter card 50 does not initiate any interrupts or bus master activity).

Hot-plug service 28 provides a gateway for users 30 and management agents 31 (via API's) to access hot-plug services. Hot-plug service 28 is unique to each particular operating system and is generally supplied by the operating system vendor. Also included with software layer 22 are adapter drivers 40. Adapter driver 40 is the software which controls adapter card 50. Adapter driver 40 is generally supplied by the adapter card vendor.

Hardware layer 24 includes a platform 44, which is the collection of hardware in which bus 48 resides. Platform 44 typically includes a power supply, one or more CPU's, a bridge (i.e., such as a host-bus-to-PCI bridge), and various peripheral devices such as disk drives and a keyboard. Platform 44 also includes hot-plug controller 38, which is hardware supplied by the platform vendor that controls the electrical aspects of powering up and powering down a slot 46.

Slot 46 is a location on bus 48 designed to accept adapter cards 50. Slot 46 is the basic unit of hot-pluggability. Individual slots 46 must be isolated from the rest of platform 44 to enable reliable insertion and removal of adapter cards 50. In one embodiment, adapter cards 50 are cards designed in accordance with the PCI Local Bus Specification, and are designed to be plugged into slots 46. In alternative embodiments, adapter cards 50 can be 32 or 64 bits wide, operate at 33 MHz or 66 MHz, and use 3.3V or 5V signaling. Adapter cards 50 can contain a single device, or multiple devices behind a bridge.

A single hot-plug controller 38 typically controls more than one slot 46, although a one-to-one correspondence between hot-plug controller 38 and slot 46 is possible within the scope of the preferred embodiment. Platform 44 typically contains more than one hot-plug controller 38, although use of a single hot-plug controller is within the scope of the present invention. An attention indicator 51 is a physical indicator located to draw the attention of the user to a particular slot 46. In one embodiment, attention indicator 51 is a light emitting diode (LED).

During normal operation, when a user determines that one or more adapter cards 50 must be removed or replaced from slots 46 that are powered up, the following sequence of steps are typically performed. First, user 30 notifies hot-plug service 28 of the desire to remove adapter card 50 from slot 46. Examples of notification methods include issuing a console command or activating a switch designed for this purpose. Next, hot-plug service 28 uses operating system functions to quiesce the appropriate adapter drivers 40, and adapter cards 50. Hot-plug service 28 then issues a hot-plug primitive 36 to hot-plug system driver 32 to turn off the appropriate slot 46. In response, hot-plug system driver 32 uses hot-plug controller 38 to: 1) assert a reset line to slot 46, and isolate slot 46 from the rest of bus 48; 2) power down slot 46; and 3) change attention indicator 51 to show slot 46 is off. Hot-plug service 28 then reports to user 30 that slot 46 is off. Finally, user 30 removes adapter card 50 from slot 46.

In a similar manner, the following general sequence of steps is necessary to insert adapter card 50 into slot 46 after the slot has been powered down and readied for insertion. First, user 30 inserts the new adapter card 50 into an appropriate slot 46. Next, user 30 notifies hot-plug service 28 to turn on the slot containing the new adapter card 50. Hot-plug service issues a hot-plug primitive 36 to hot-plug system driver 32 to turn on the appropriate slot 46. Hot plug system driver 32 instructs hot-plug controller 38 to: 1) power up slot 46; 2) de-assert the reset line on slot 46 and connect slot 46 to the rest of the bus; and 3) change attention indicator 51 to show slot 46 is on. Next, hot-plug service 28 notifies operating system 26 that new adapter card 50 is installed, so that operating system 26 initializes the new adapter card 50 and prepares adapter card 50 for use. Finally, hot-plug service 28 notifies user 30 that the new adapter card 50 is ready for use.

The preferred embodiment incorporates a test connector 102 within platform 44, which enables an external tester 103 to directly enable/disable hot-plug controller 38 during testing, thus providing external tester 103 with direct access to each slot 46 on the backplane. Test connector 102 uses existing unutilized signals within the bus to pass test directives and results between external tester 103 and the slot 46 under test. Test connector 102 is described in greater detail in FIG. 2.

Figure 2:
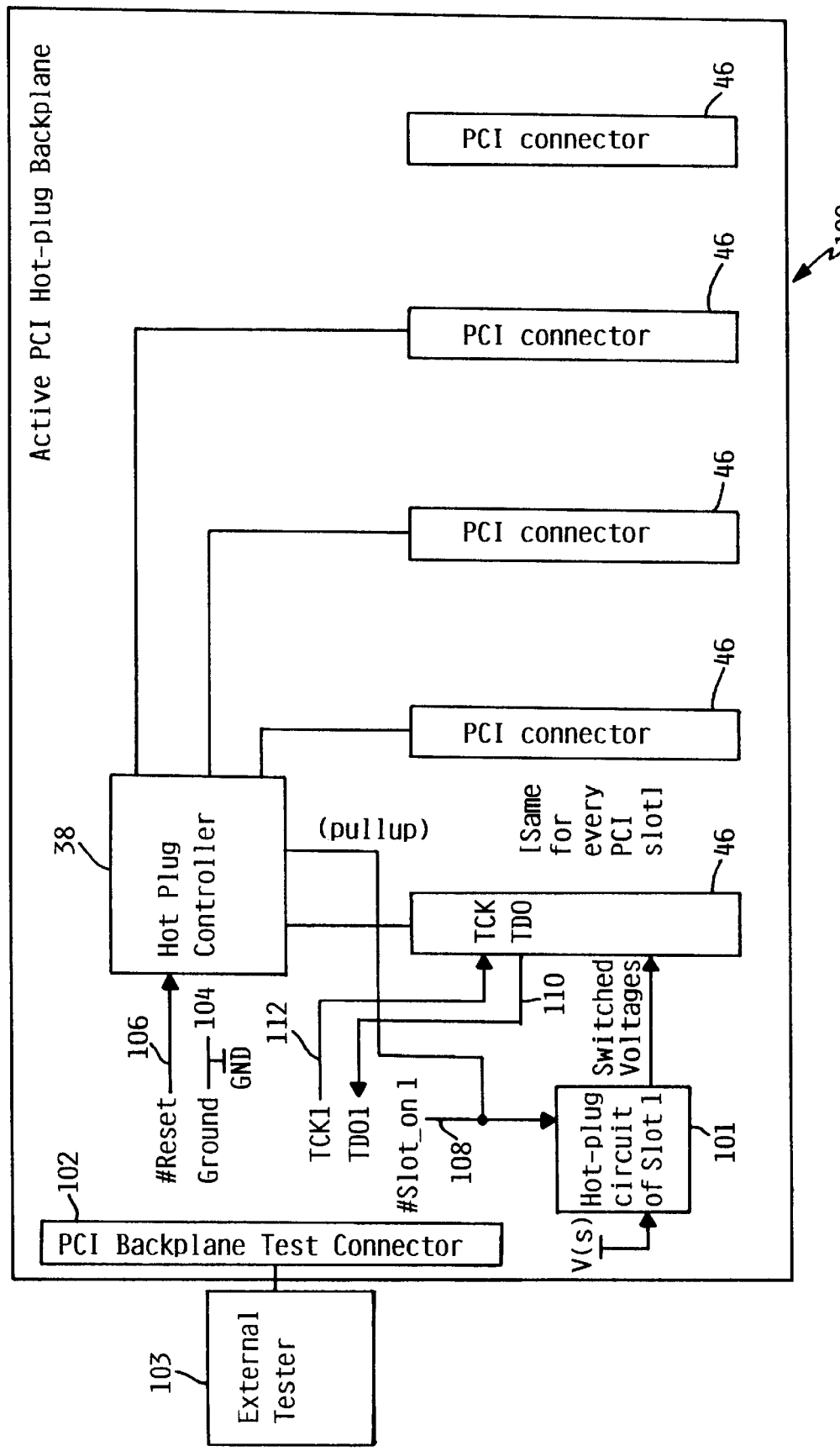
FIG. 2 is a block diagram of an active hot-plug backplane in accordance with the preferred embodiment.

FIG. 2 is a block diagram of a hot-plug backplane in accordance with the preferred embodiment, shown generally at element 100. In the preferred embodiment, backplane 100 is a PCI backplane. However, it is contemplated that any backplane supporting hot-plug operation similar to that of the preferred embodiment falls within the scope of the present invention.

Backplane 100 resides within platform (FIG. 1, element 44), and is generally defined as a circuit board containing sockets where other circuit boards are plugged in. Backplanes 100 are often described as being either active or passive. Active backplanes contain, in addition to the sockets, semiconducting components. In contrast to active backplanes, passive backplanes contain no logical modules.

In a preferred embodiment, an active backplane 100 is employed, which includes, but is not limited to: bus 48, a plurality of slots 46, a hot-plug circuit 101 associated with each of the plurality of slots 46, one or more adapter cards (FIG. 1, element 50), at least one hot-plug controller 38, and a backplane test connector 102 (described below in greater detail).

In a preferred embodiment, test connector 102 is mounted directly to the surface of backplane 100. Signals are routed from test connector 102 to hot-plug controller chips 38, hot-plug circuits 101, and slots 46 via signal lines present on bus 48. In an alternative embodiment, test connector 120 is not populated, but is used by a tester connector that is lowered by a test fixture to directly contact the pins of non-populated connector 120.

In a preferred embodiment, test connector 102 includes a GROUND signal 104, a #RESET signal 106, and three separate signals for each slot 46 on backplane 100: #SLOT_ON 108, TDO 110 and TCK 112. GROUND signal 104 is the backplane ground potential. #RESET signal 106 connects to each hot-plug controller chip 38. When #RESET signal 106 is asserted, the hot-plug controller chips 38 are held in reset and release control of hot-plug circuit 101. #SLOT_ON signal 108 is wired to each hot-plug circuit 101, such that when #RESET signal 106 is asserted, a specific hot-plug circuit 101 can be toggled on and off by asserting/de-asserting #SLOT_ON signal 108 through test connector 102. After hot-plug circuit 101 shuts off (e.g., overcurrents), hot-plug circuit 101 requires a toggle of #SLOT_ON signal 108 to turn the hot-plug circuit back on.

In the preferred embodiment, TDO signal 110 and TCK signal 112 are PCI Specification signals for the PCI slot connector 46. As stated in the PCI Specification for a PCI backplane not using JTAG, TDO signal 110 is not connected to anything and TCK signal 112 utilizes a pulldown resistor. Since these signals are typically unused on backplane 100, these unused signals are used within the preferred embodiment to couple each slot 46 to test connector 102.

TCK signal 112 is used as a serial communication line from test connector 102 to control logic on a test adapter card 53. Test adapter card 53 is described in greater detail in FIG. 3. TCK signal 112 is used to control resistive loading (nominal and overcurrent loads) placed by test adapter card 53 on each of the four switched voltages (i.e., +3.3V, +5V, +12V, and −12V) supplied to slot 46.

TDO signal 110 is used to return the output of a selected hot-plug switched voltage after a resistive load has been applied to the switched voltage. By monitoring TDO signal 110, an external tester 103 connected to test connector 102 observes whether any of the switched voltages have shut down due to a selected controlled resistive loading applied by test adapter card 53.

By adding an inexpensive backplane test connector 102 to a standard active hot-plug backplane 100, a backplane manufacturer is now able to externally turn on each slot 46 and use a load variation to overcurrent each slot voltage, measure the overcurrent level, and verify that the overcurrent falls within the correct range. If the backplane fails this functional test, the backplane manufacturer knows there is a manufacturing build problem (i.e., failure) with the hot-plug circuit 101 of slot 46 on backplane 100.

Figure 3:
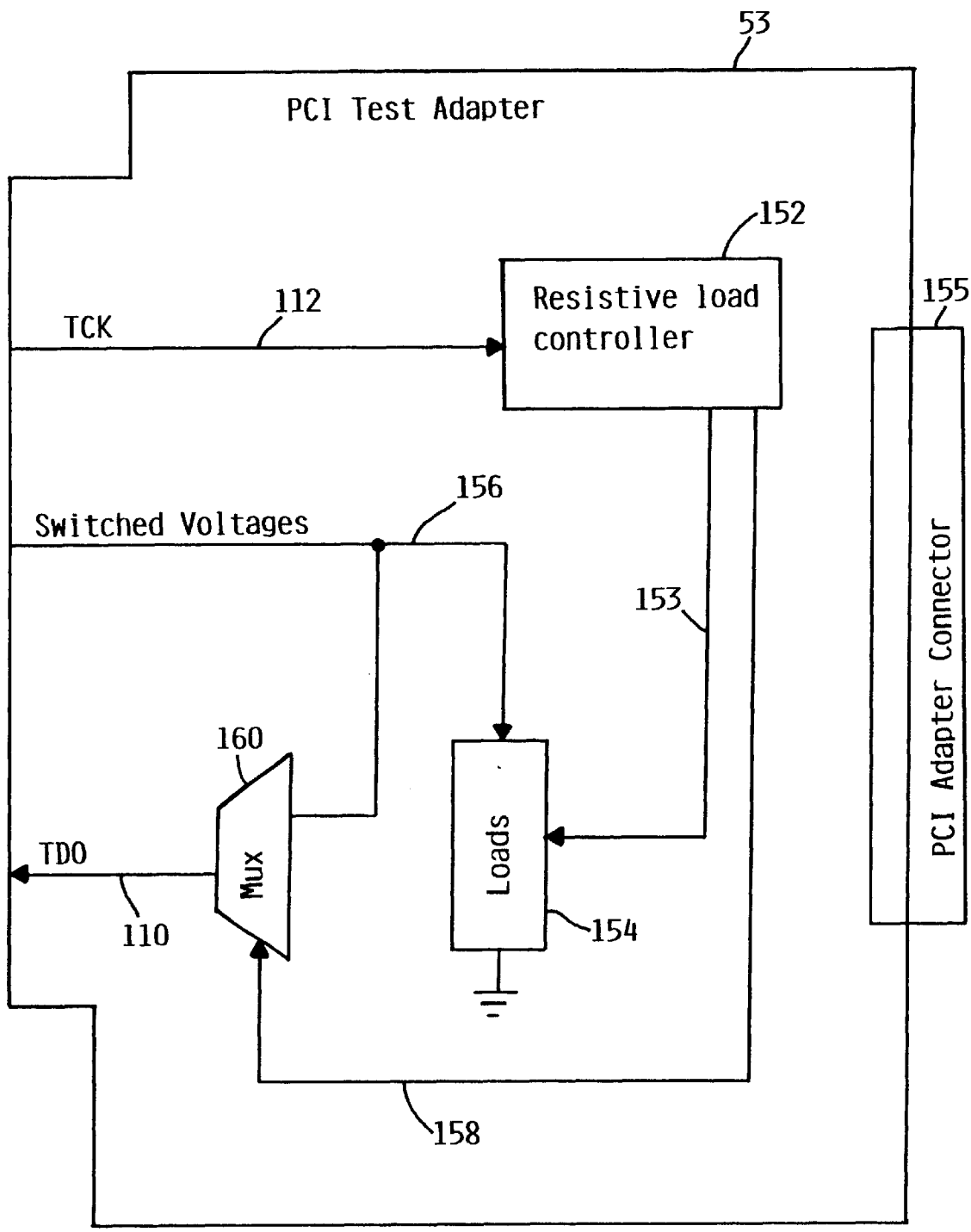
FIG. 3 is a block diagram of a test adapter of the preferred embodiment, which is inserted into a card slot of the active hot-plug backplane illustrated in FIG. 2.

FIG. 3 is a block diagram of a preferred embodiment of test adapter card 53. Test adapter card 53 is inserted into a slot (FIG. 1, element 46) of active hot-plug backplane 100 previously illustrated in FIG. 2. Test adapter card 53 includes a resistive load controller 152 which receives a command via TCK signal 112 (i.e., serial communication line) from test connector 102, then generates a response signal 153 which selects an appropriate resistive load 154 to apply to a switched voltage 156. A multiplexer select signal 158 is also routed from resistive load controller 152 to a multiplexer 160 to select the switched voltage 156 to return to external tester 103 via TDO signal 110.

The same test adapter card 53 used to perform the analog resistive load test on hot-plug circuit 101 is also used during digital test, since none of the same signals used during the analog test are used during the digital test. A PCI adapter card 50 is plugged into test adapter card 53 via PCI adaptor connector 155 in order to perform the digital test.

Figure 4B:
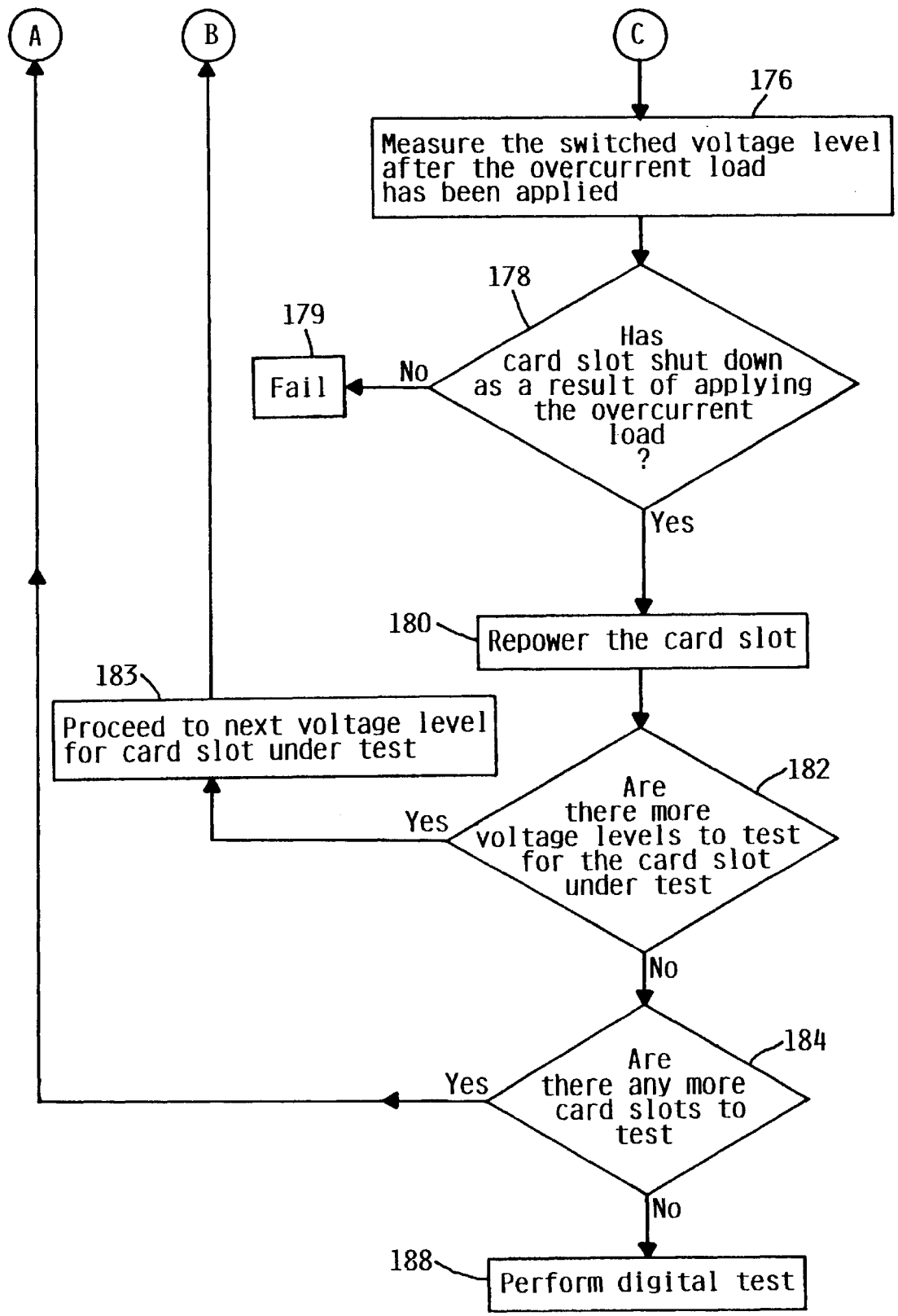
FIG. 4 is a flow diagram illustrating a method of testing hot-plug circuits on an active computer backplane in accordance with the preferred embodiment.

FIG. 4 is a flow diagram illustrating a method of testing hot-plug circuits 101 on an active computer backplane 100 in accordance with the preferred embodiment. In the preferred embodiment, active computer backplane 100 is a PCI backplane, however the method illustrated in FIG. 4 is compatible with any backplane which incorporates hot-plug technology similar to that employed within hot-plug compatible PCI backplanes.

The method begins by inserting test adapter card 53 into slot 46 to be tested, as shown at block 161. As stated earlier, test adapter card 53 includes resistive load controller 152 which receives a resistive load command from external tester 103, then applies the selected resistive load to a selected voltage level for the slot under test.

Next, at block 162, external tester 103 is connected to backplane test connector 102. External tester 103 is any device capable of transmitting a resistive loading command to test adapter card 53 via TCK signal 112, and receiving/measuring a switched voltage output from test adapter card 53 after the selected resistive load 154 has been applied to the selected switched voltage 156.

At block 164, after external tester 103 has been connected to backplane test connector 102, #RESET signal 106 is asserted by external tester 103 such that one or more hot plug controller chip(s) 38 on backplane 100 are held in reset, and release control of the hot-plug circuits 101 on backplane 100. By asserting #RESET signal 106, each slot 46 (and its associated hot plug circuit 101) can be individually powered up/down and addressed by external tester 103.

At block 166, external tester 103 activates the slot 46 containing the test adapter card 53 by asserting the #SLOT_ON signal 108. After slot 46 containing test adapter card 53 has been turned on, a command is issued from external tester 103 to the test adapter card 53 to apply a nominal voltage load on a switched voltage for slot 46, as shown at block 168. The nominal voltage load applied on the switched voltage is chosen such that application of the nominal voltage load should not cause the associated hot plug circuit 101 to shut down slot 46, if the hot plug circuit 101 is operating properly.

In the preferred embodiment, the typical overcurrent limit for the +3.3V voltage level occurs between approximately 11 amps and approximately 14.5 amps, so the nominal voltage load is chosen to produce a current less than 11 amps. The typical overcurrent limit for the +5V voltage level occurs between approximately 8.2 amps and approximately 11.2 amps, so the nominal voltage load is chosen to produce a current less than 8.2 amps. Similarly, the typical overcurrent limit for the +12V voltage level occurs between approximately 0.86 amps and approximately 1.24 amps, so the nominal voltage load is chosen to produce a current less than 0.86 amps. Finally, the typical overcurrent limit for the −12V voltage level occurs between approximately 0.2 amps and approximately 0.34 amps, so the nominal voltage load is chosen to produce a current less than 0.2 amps. In alternative embodiments, voltage levels and operating limits corresponding to the voltage levels can vary.

After the nominal voltage load has been applied by test adapter card 53 on the switched voltage for the card (i.e., block 168), the switched voltage level is measured by external tester 103, as shown at block 170. At block 172, if external tester 103 determines that the adapter card slot 46 has shut down upon application of the nominal voltage load, external tester 103 logs an error, and the test is terminated, as shown at block 173. The failed backplane is then sent for repair. If application of the nominal voltage load by test adapter card 53 does not cause the adapter card slot to shut down (the normal condition), processing continues at block 174.

At block 174, a command is issued from external tester 103 to test adapter card 53 to apply an switched overcurrent load on the selected switched voltage for card 46. The overcurrent load applied on the selected switched voltage is chosen such that application of the overcurrent load should cause the associated hot plug circuit 101 to shut down slot 46, if hot plug circuit 101 is operating properly. In one embodiment, the operating limit for the +3.3V voltage level occurs between approximately 11 amps and approximately 14.5 amps, so the overcurrent load is chosen to produce a current greater than 14.5 amps. The operating limit for the +5V voltage level occurs between approximately 8.2 amps and approximately 11.2 amps, so the overcurrent load is chosen to produce a current greater than 11.2 amps. Similarly, the operating limit for the +12V voltage level occurs between approximately 0.86 amps and approximately 1.24 amps, so the overcurrent load is chosen to produce a current greater than 1.24 amps. Finally, the operating limit for the −12V voltage level occurs between approximately 0.2 amps and approximately 0.34 amps, so the overcurrent load is chosen to produce a current greater than 0.34 amps.

After the overcurrent load has been applied by test adapter card 53 on the switched voltage for the card (i.e., block 174), the switched voltage level is measured, as shown at block 176. At block 178, it is determined whether the adapter card slot 46 has shut down upon application of the overcurrent load. If the adapter card slot does not shut down, external tester 103 logs an error, as shown at block 179. If application of the overcurrent load causes slot 46 to shut down (the normal condition), a command is issued by external tester 103 to repower card slot 46 prior to the next resistive loading test, as shown at block 180.

After both the nominal and overcurrent loads have been applied by test adapter card 53 to the selected voltage level for card slot 46, it is determined whether any additional voltage levels need to be tested for the card slot under test 46, as shown at block 182. If so, the resistive loading tests (blocks 168–178) are repeated for all remaining voltage levels for the slot under test 46, as shown at block 183, otherwise processing continues at block 184.

After the nominal and overcurrent voltage loads have been applied by test adapter card 53 to all voltage levels for the card slot 46 currently under test, it is determined whether any additional card slots 46 need to be tested on backplane 100, as shown at block 184. If so, test adapter card 53 is inserted into the next available slot 46 on the backplane (as described at block 186) and the resistive tests and measurements (i.e., blocks 166–182) are repeated for the newly chosen card slot 46. In one embodiment, multiple adapters can be utilized in order to minimize operator interactions required during the backplane test.

Finally, after the nominal and overcurrent voltage load have been applied by test adapter card 53 for all voltage levels of all card slots 46 on backplane 100, a digital test is performed by test adapter card 53 on the plurality of slots 46 on the backplane, as shown at block 188. PCI adapter 50 is plugged into test adapter card 53 during the digital test. In an alternative embodiment, the digital test may be performed on a given slot immediately after the analog testing has been completed for a given slot.

Figure 5A:
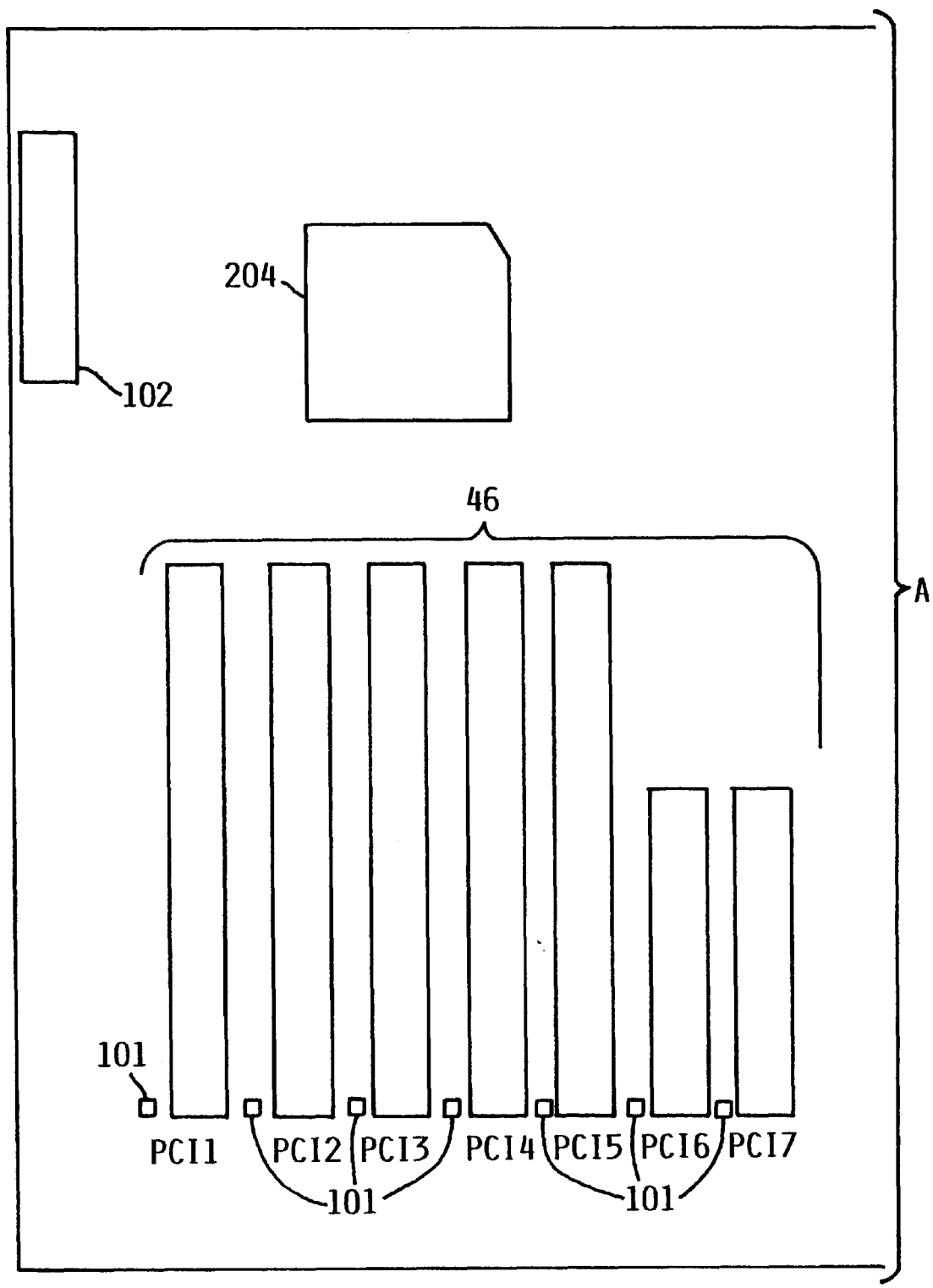
FIG. 5 is a schematic diagram of a hot-plug backplane in accordance with the preferred embodiment.
Figure 5B:
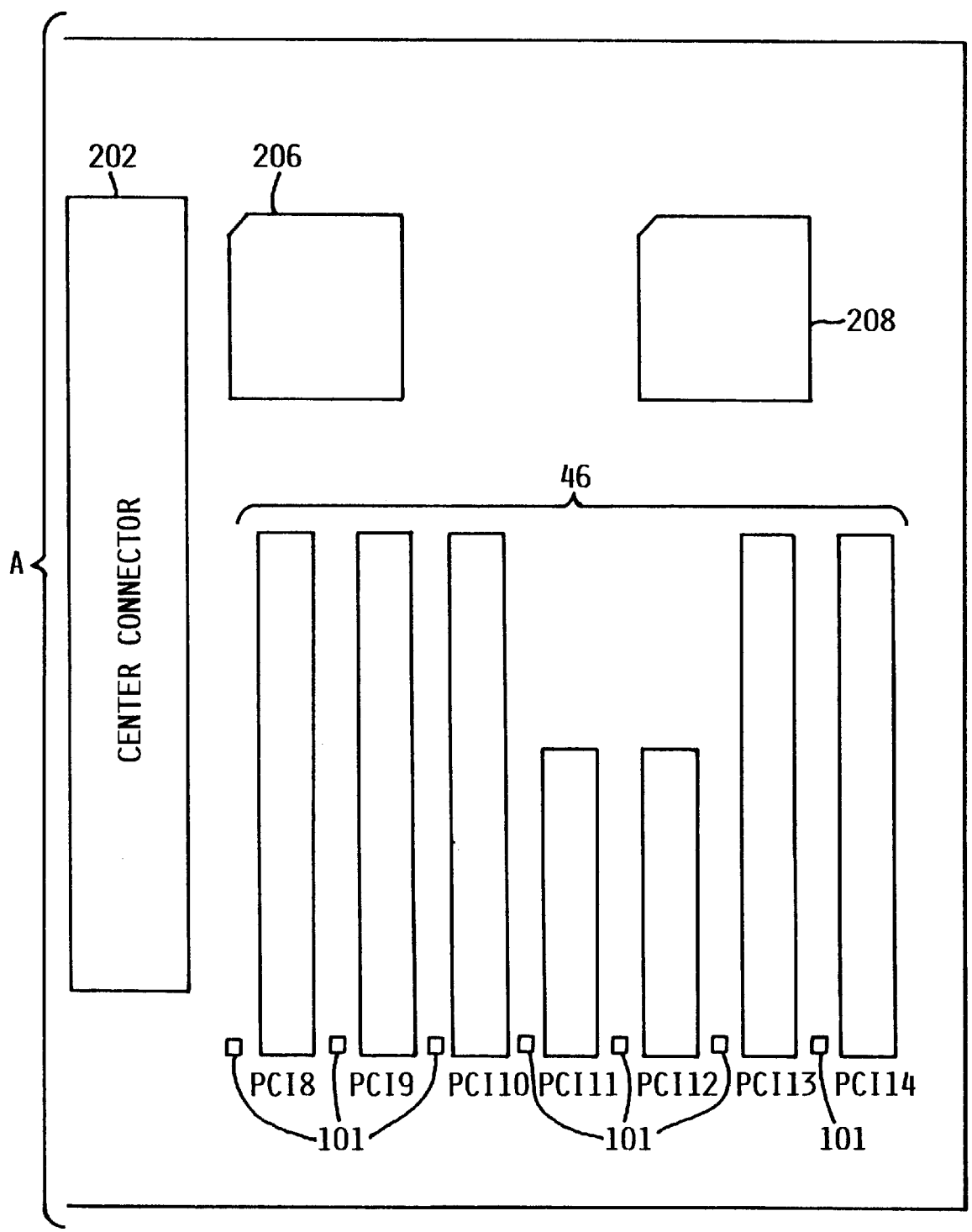
Figure 6A:
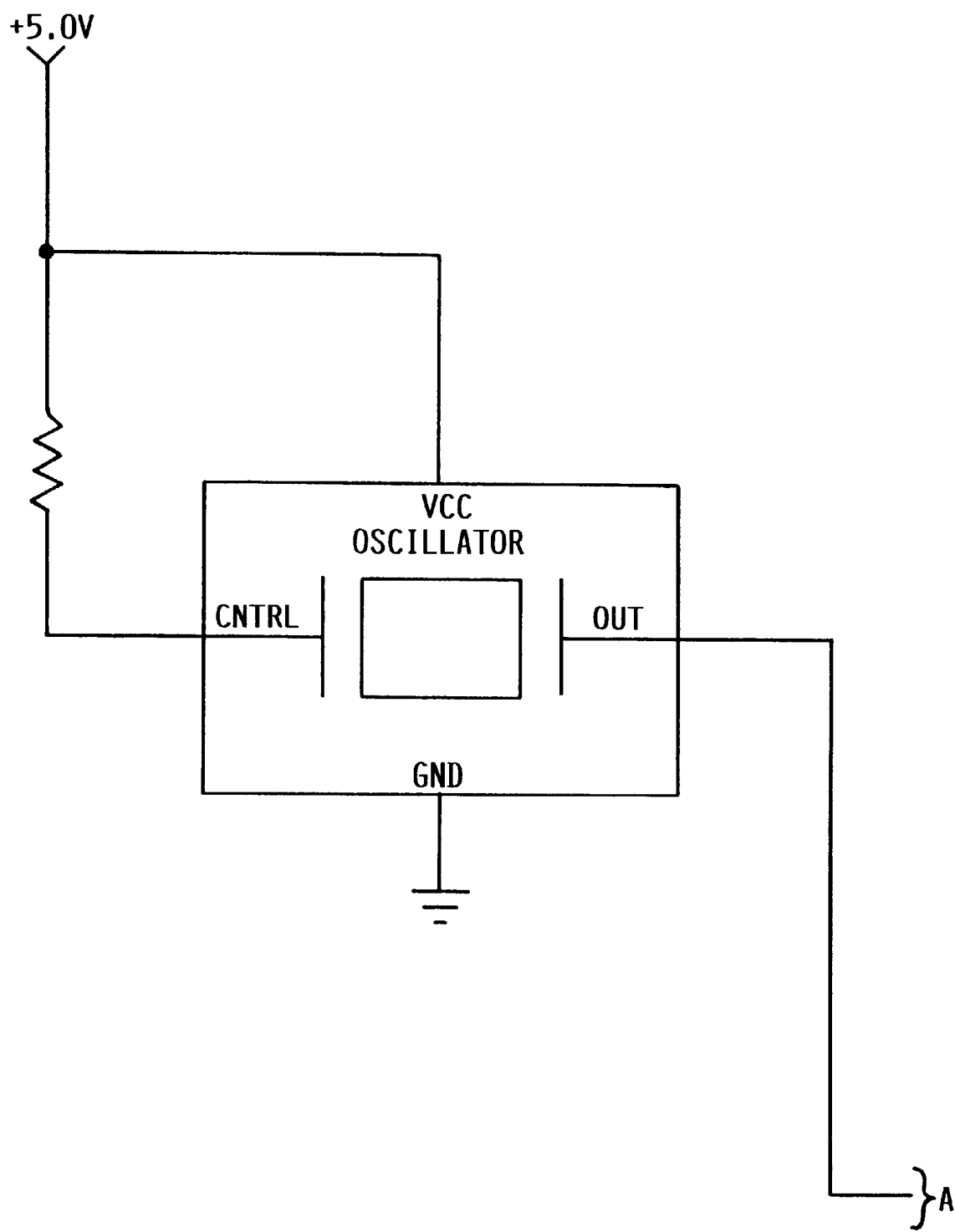
FIG. 6 is a schematic diagram of a preferred embodiment microprocessor on the test adapter card used to control resistive loading on the voltages of the backplane in accordance with the preferred embodiment.
Figure 6B:
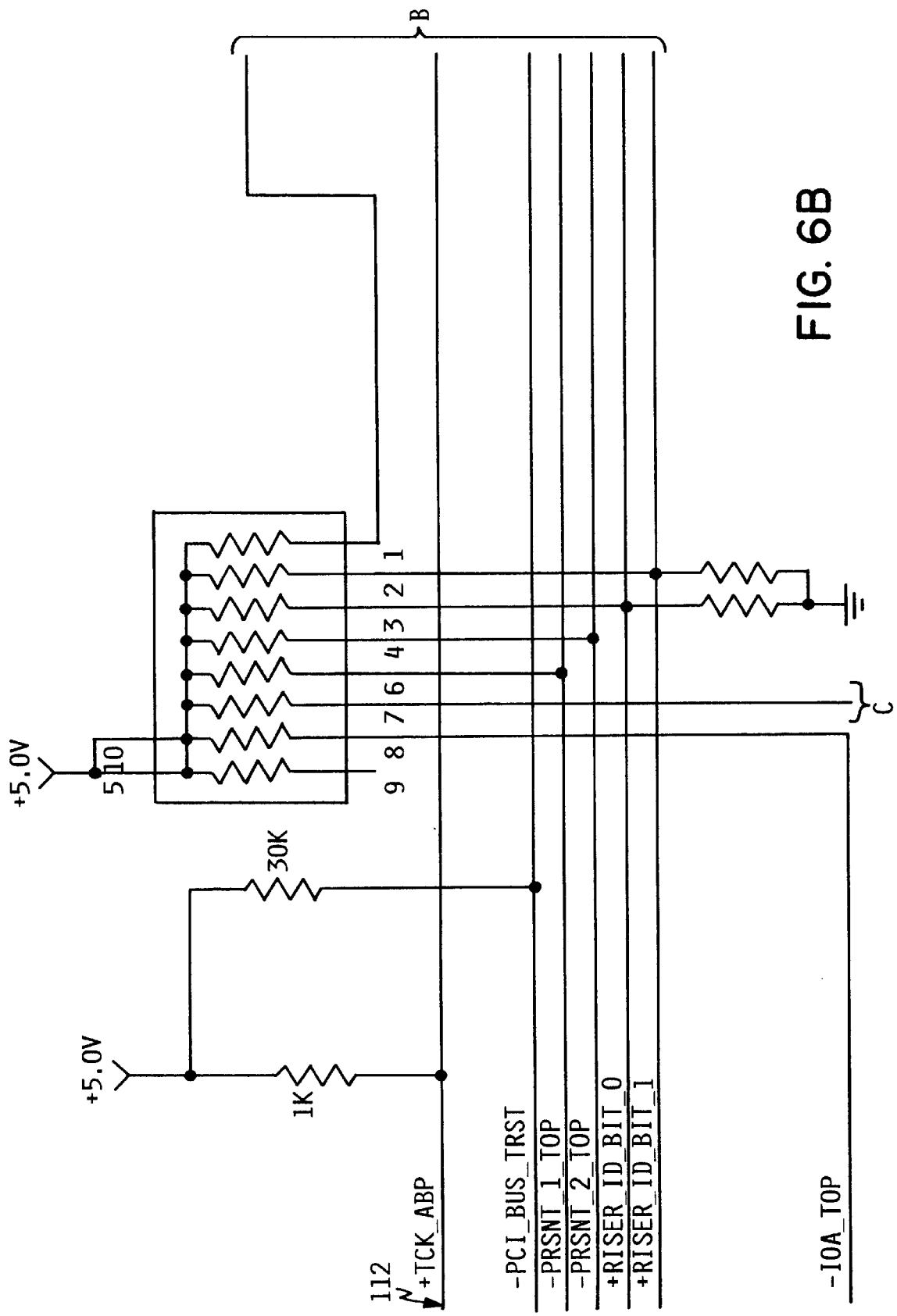
Figure 6C:
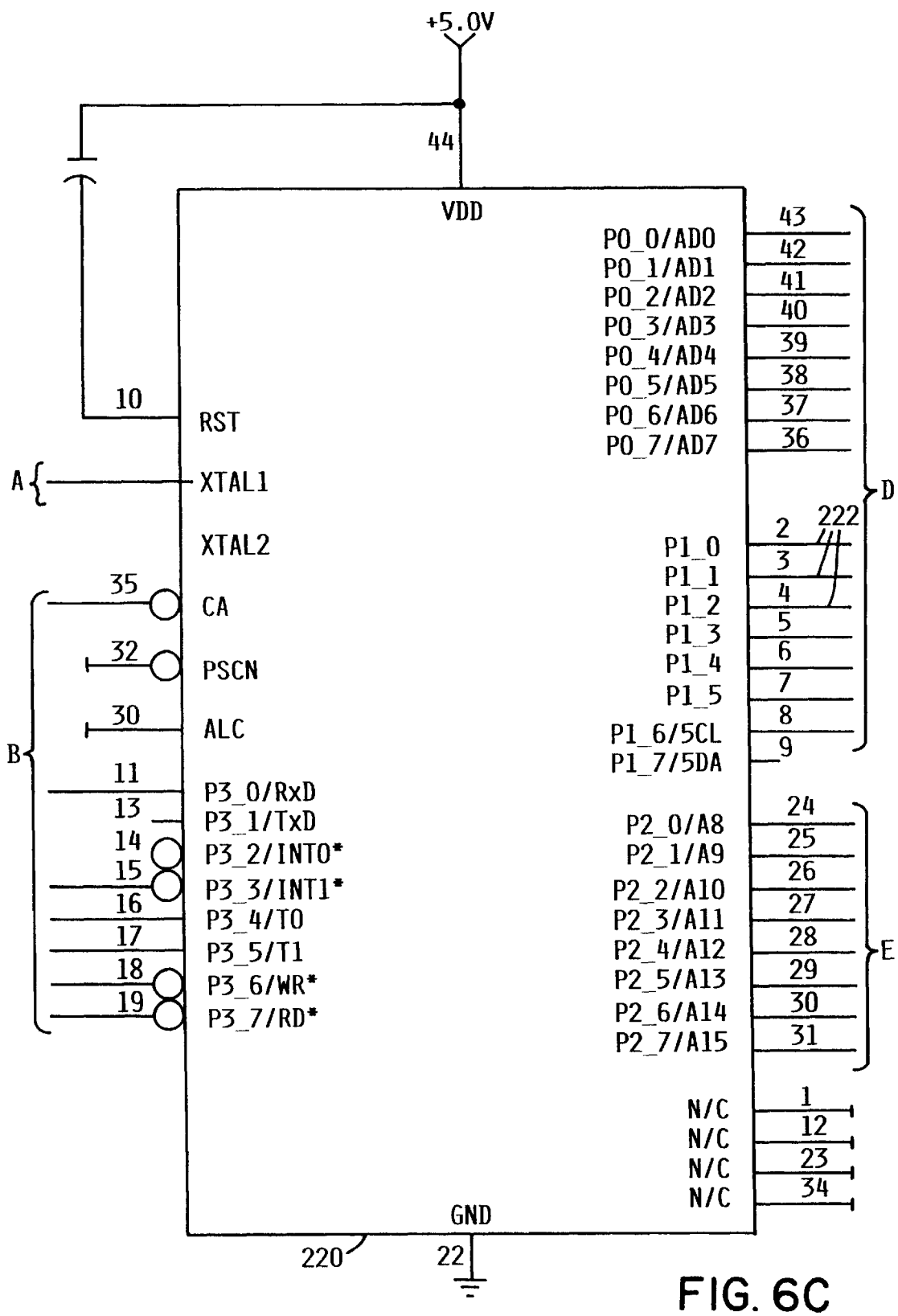
Figure 6D:
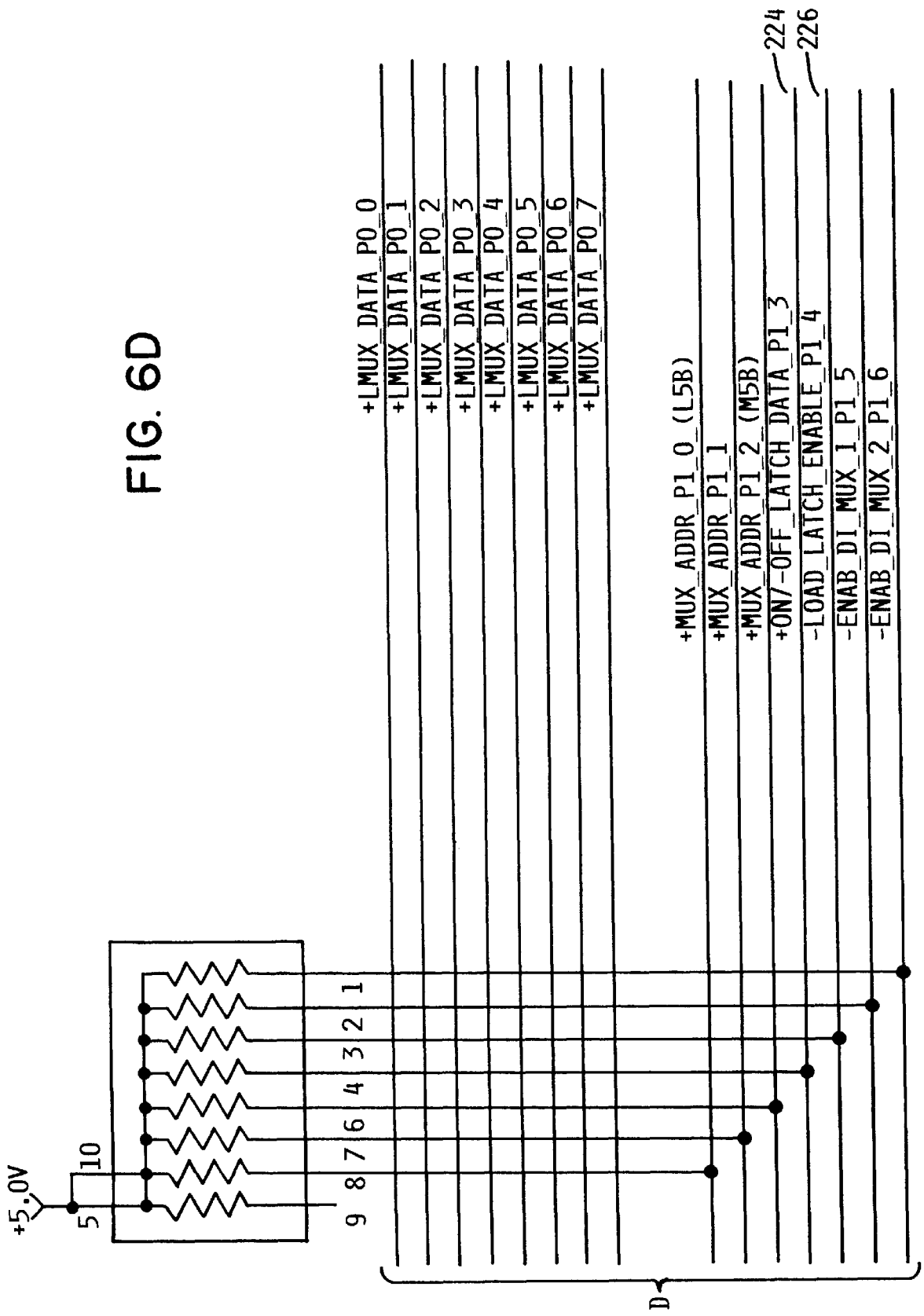
Figure 6E:
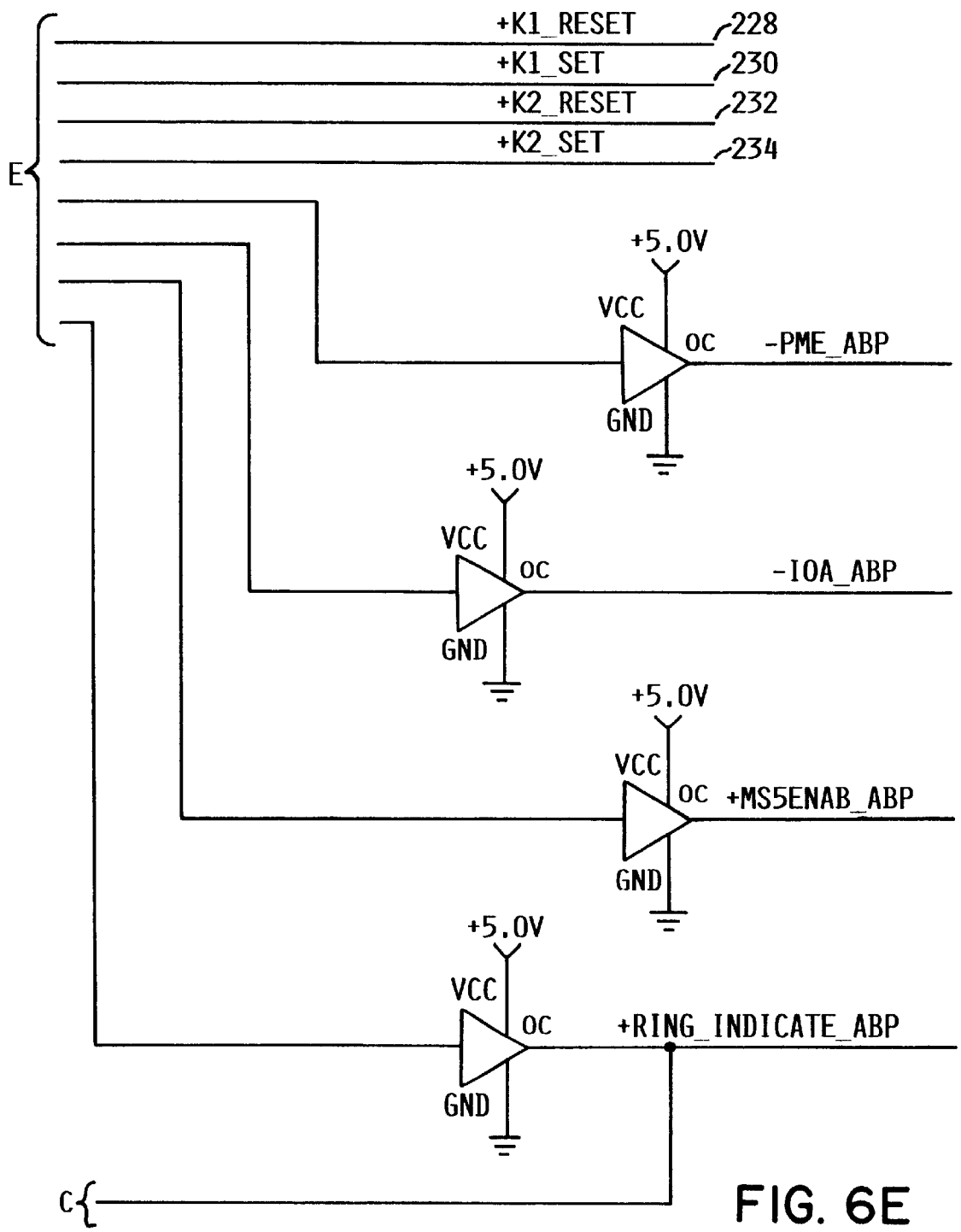

FIG. 5 is a schematic diagram of a preferred embodiment of a hot-plug backplane 100. In the preferred embodiment, hot-plug backplane 100 is a PCI backplane. However, other types of hot-plug type backplanes fall within the scope of the present invention. In the illustrated embodiment, backplane 100 connects to bus (FIG. 1, element 48) via center connector 202. In the preferred embodiment, backplane 100 includes a total of fourteen card slots 46 (ten of the card slots are 64 bit, 3.3V slots, and four of the slots are 32 bit, 5V slots). In alternative embodiments, the number and type of cards present on the hot-plug backplane can vary.

The illustrated backplane 100 also includes three hot-plug controllers 204, 206 and 208 which manage the fourteen card slots 46. The first hot-plug controller 204 manages card slots 1–4, the second hot-plug controller 206 manages card slots 5–9, and the third hot-plug controller 208 manages card slots 10–14. In alternative embodiments, the number and configuration of hot-plug controllers employed on backplane 100 can vary.

Associated with each of the fourteen card slots 46 is a hot-plug circuit 101, which controls the voltage level of card slot 46. Backplane 100 also includes test connector 102 which connects to external tester 103 used for analog testing of hot-plug circuits 101.

FIG. 6 is a schematic diagram of a microprocessor 220 on test adapter card 53 which applies resistive loading on the voltages of the backplane 100 in accordance with the preferred embodiment. In the illustrated embodiment, TCK signal 112 is routed from the external tester 103 to microprocessor 220 via test connector 102. As described above, TCK signal 112 is used as a serial communication line from test connector 102 to control logic on the test adapter card 53. TCK signal 112 is used to control resistive loading (nominal and overcurrent loads) on the test adapter card 53 for each of the four switched voltages (i.e., +3.3V, +5V, +12V, and −12V). Upon receiving TCK signal 112 from external tester 102, microprocessor 220 sends a load selection to a latch via a three bit multiplexer address bus 222 and an associated latch data signal 224 and latch enable signal 226. Three bit multiplexer address bus 222 is able to represent eight possible resistive loading selections (i.e., +3.3V nominal, +3.3V overload, +5V nominal, +5V overload, +12V nominal, +12V overload, −12V nominal and −12V overload). Microprocessor 220 also outputs selection signals +K1_RESET 228, +K1_SET 230, +K2_RESET 232, and +K2_SET 234 to a voltage output selection multiplexer 236 (further described in FIG. 7) to select an appropriate voltage signal to return to external tester.

Figure 7A:
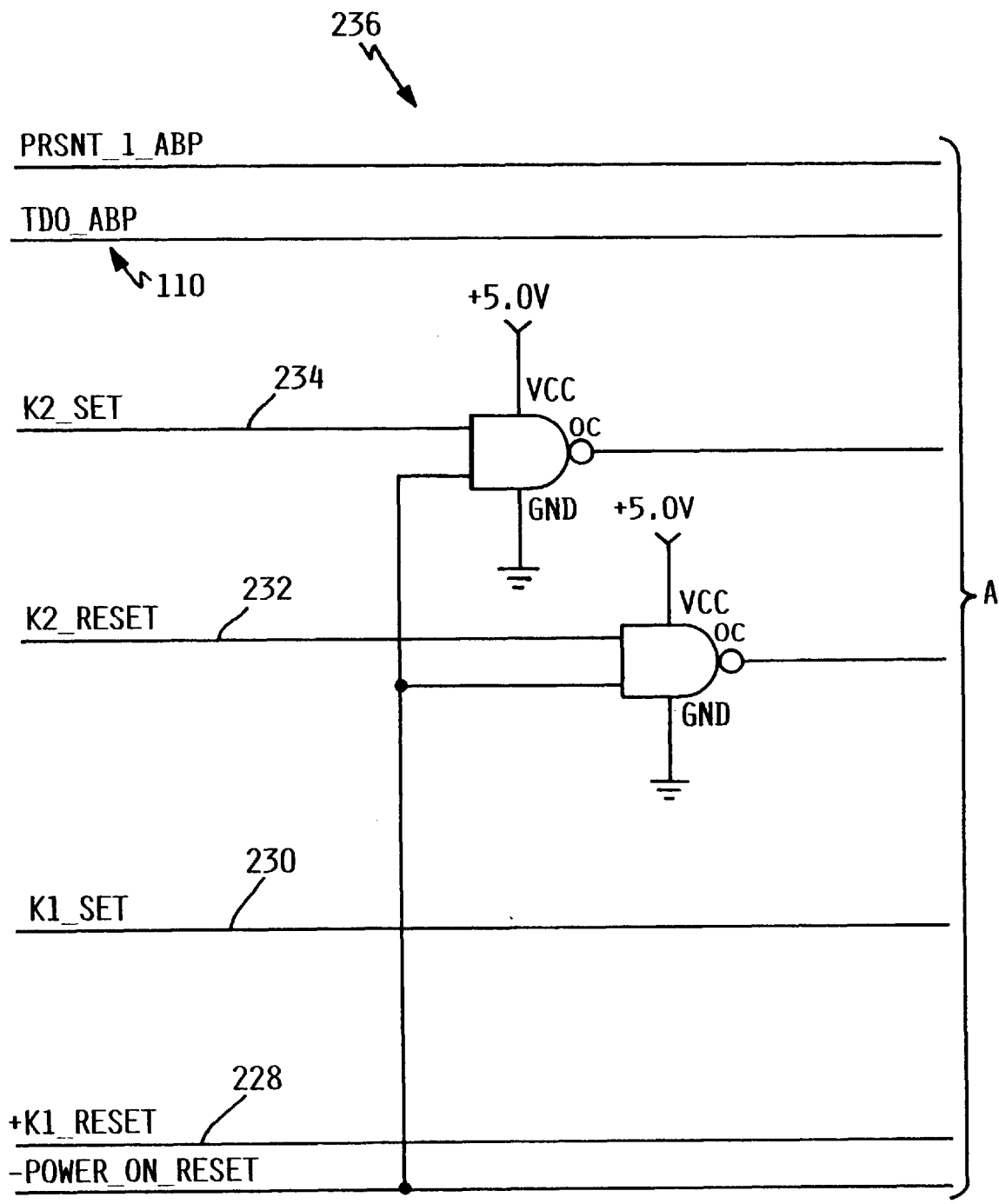
FIG. 7 is a schematic diagram of a preferred embodiment multiplexer on the test adapter card.
Figure 7B:
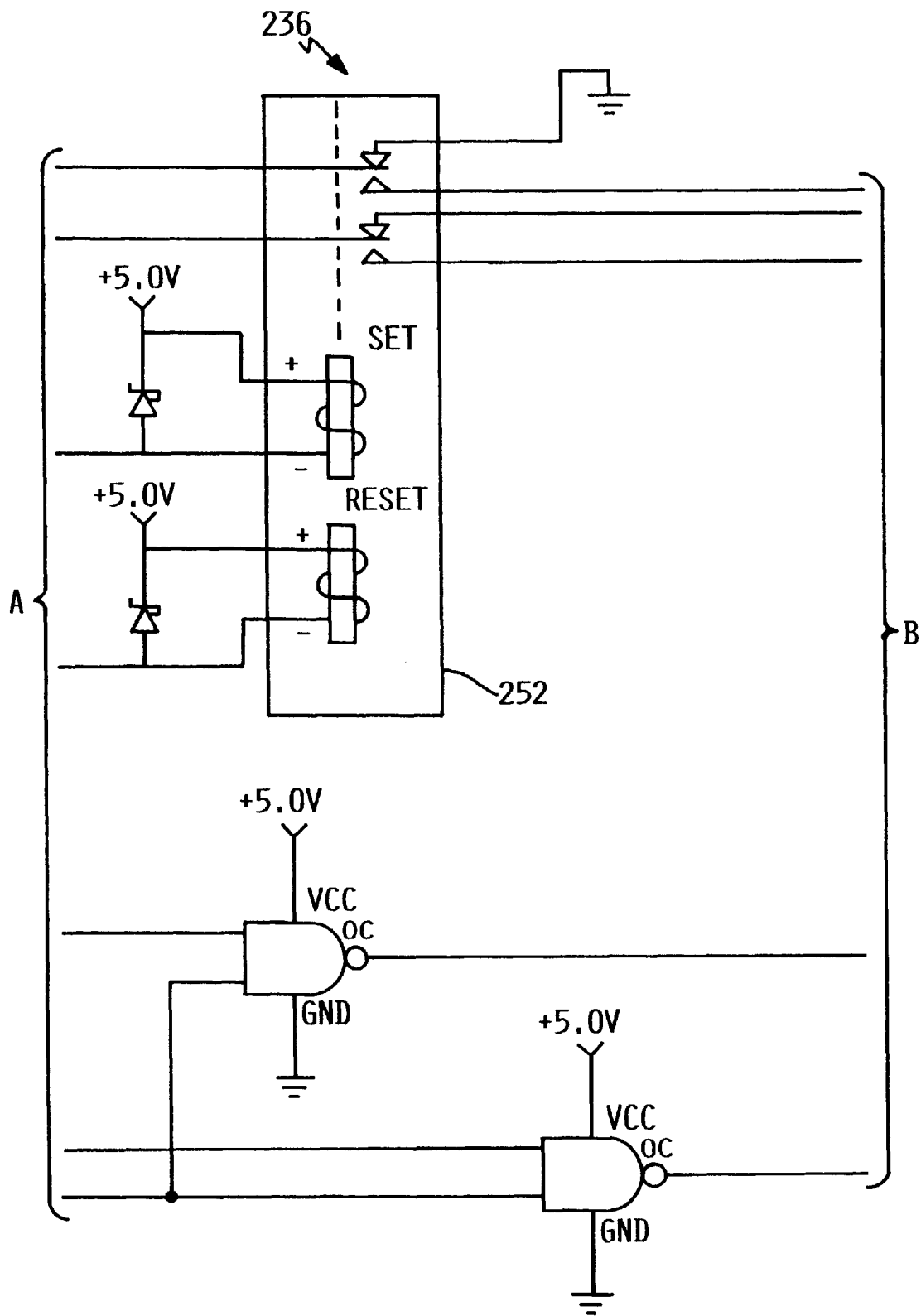
Figure 7C:
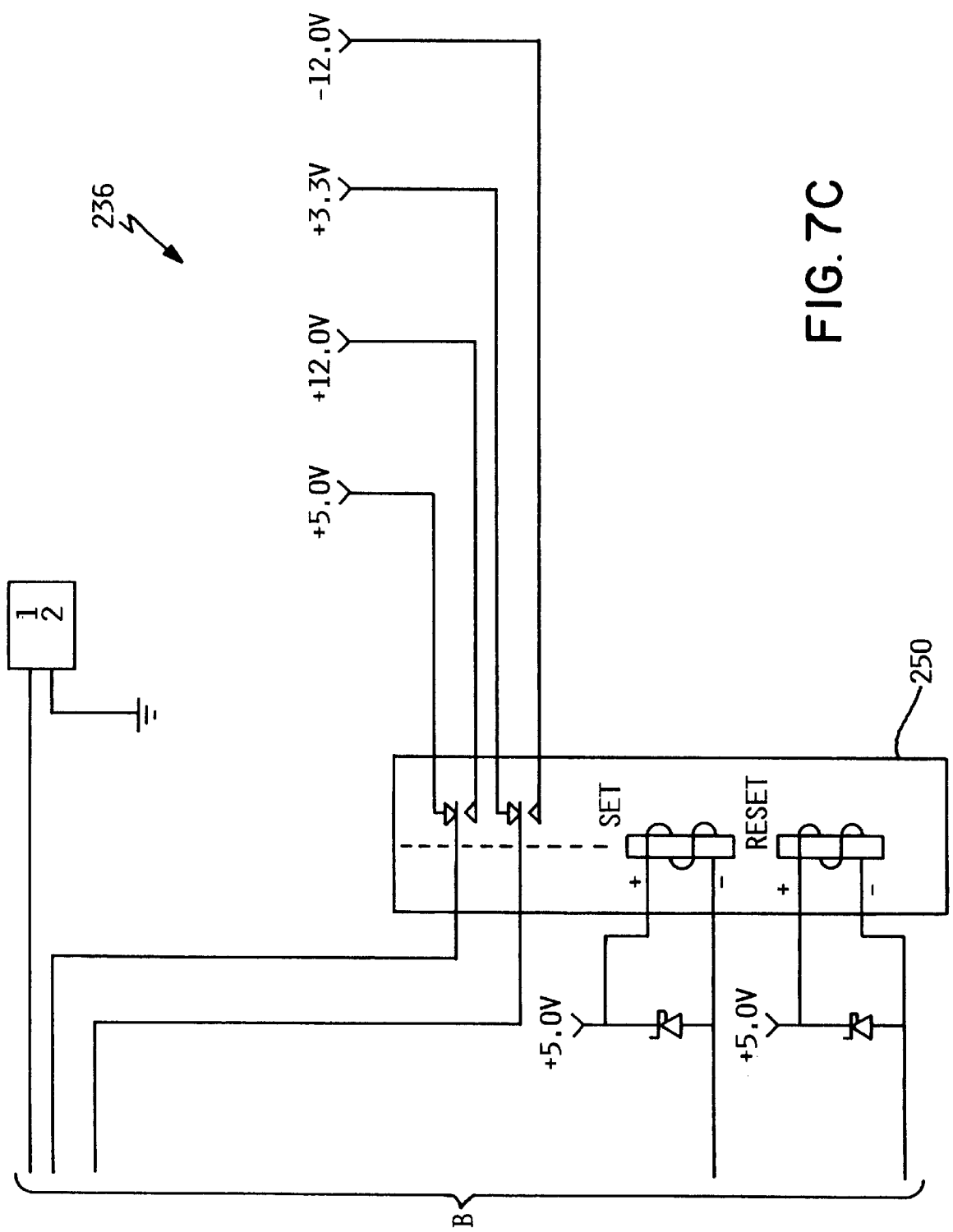
Figure 8A:
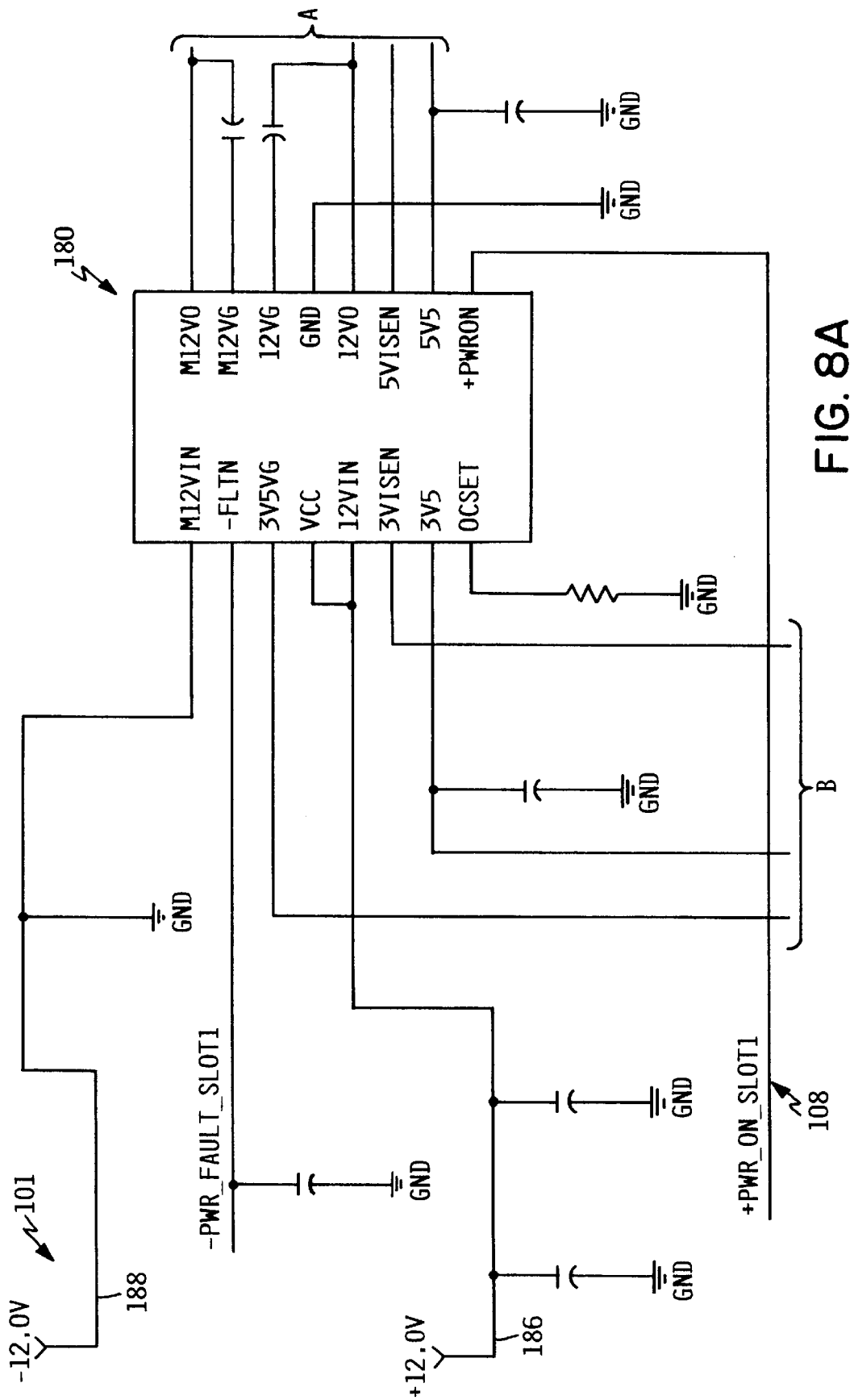
FIG. 8 is a schematic diagram of a hot-plug circuit in accordance with the preferred embodiment.
Figure 8B:
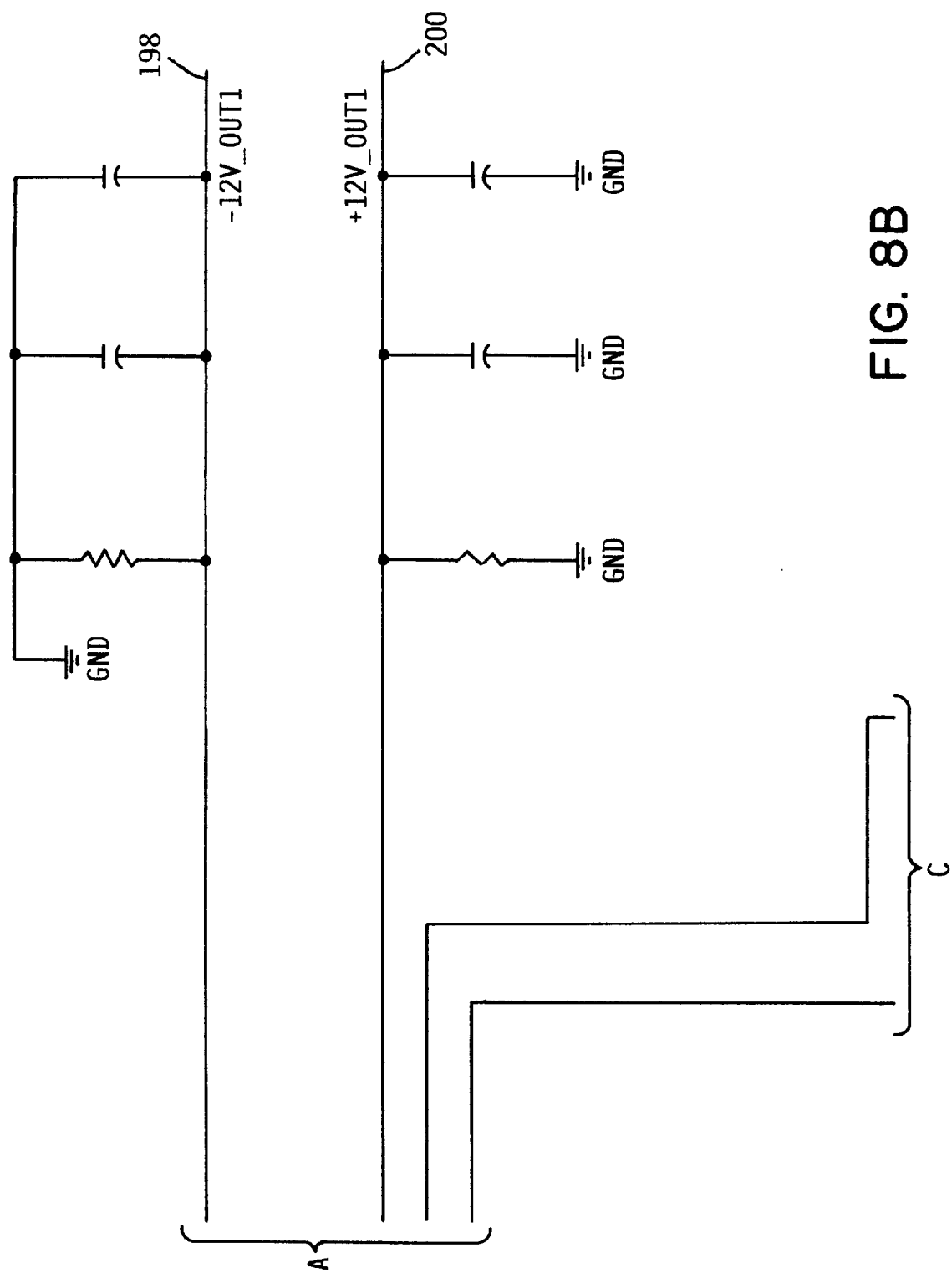
Figure 8C:
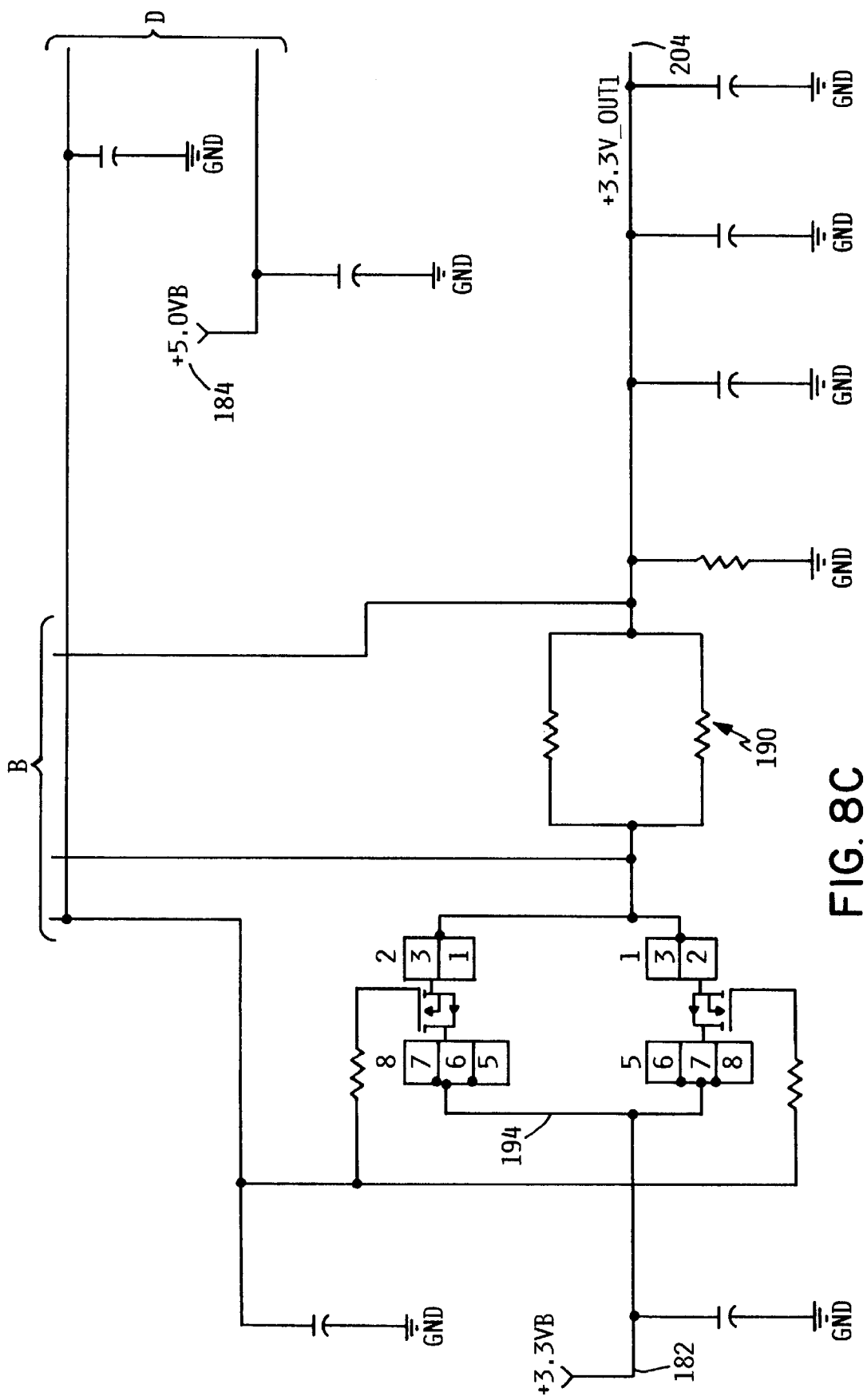
Figure 8D:
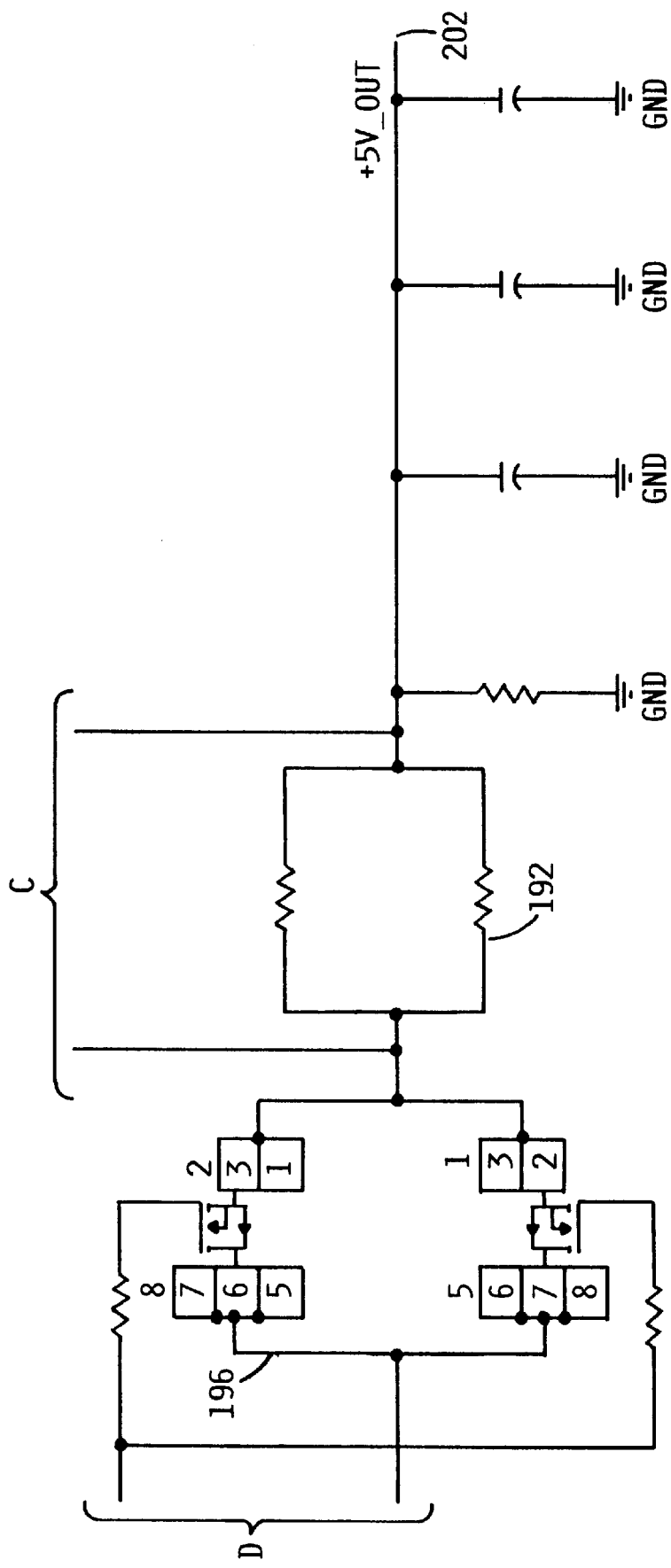

FIG. 7 is a schematic diagram of voltage selection multiplexer 236 on test adapter card 53, the voltage selection multiplexer returning a selected voltage (TDO 110) to external tester 103 via test connector 102 in accordance with the preferred embodiment. Voltage selection multiplexer 236 includes two relays 250 and 252, which combine to form a 4-to-1 multiplexer. The four voltages (i.e., +3.3V, +5.0V, +12V and −12V) are input to the first relay 250. Selection signals +K1_RESET 228 and +K1_SET 230 generated by microprocessor 220 are provided as selection signals for first relay 250. Two of the four voltages are selected from first relay 250 and are provided as inputs to second relay 252. Selection signals +K2_RESET 232 and +K2_SET 234 generated by microprocessor 220 are provided as selection signals for second relay 252. One of the two voltages is selected from second relay 252 and is passed back to external tester 103 via TDO signal 110. As stated earlier, TDO signal 110 provides external tester 103 with a switched voltage signal which indicates if the slot 46 currently under test has shut down due to resistive loads applied on the selected switched voltage signal by test adapter card 53.

FIG. 8 is a schematic diagram of a hot-plug circuit 101 in accordance with the preferred embodiment. Hot-plug circuit 101 includes a hot-plug module 180 which monitors the voltage drop across sense resistors placed on the voltage line, and if the current is too high, shuts down the voltage (i.e., known as overcurrent). In the illustrated embodiment, four voltages are monitored by hot-plug module 180: a +3.3V source 182, a +5V source 184, a +12V source 186, and a −12V source 188. In the case of +12V source 186, and −12V source 188, the voltage drop is measured across sense resistors internal to hot-plug module 180 itself. In the case of +3.3 V source 182, the voltage drop is measured across a pair of milliohm sense resistors 190. Similarly, for +5V source 184, the voltage drop is measured across another pair of milliohm sense resistors 192.

Hot-plug module receives #SLOT_ON signal 108 from hot-plug controller 38 and also from external tester 103 via test connector 102. External tester 103 toggles hot-plug circuit 101 on and off by asserting/de-asserting #SLOT_ON signal 108, while holding hot-plug controller 38 in reset. If hot-plug circuit 101 overcurrents during the analog testing procedure, a toggle of the #SLOT_ON signal is required in order to repower hot-plug circuit 101. Switching transistors 194 and 196 are used to switch on/off the +3.3V and +5V source voltages, respectively (i.e., control the flow from hot-plug circuit 101 to slot 46. The switching of the +12V and −12V source voltages is performed internally within hot-plug module 180. The switched −12V, +12V, +5V and +3.3V signals are provided to slot 46 via outputs 198, 200, 202 and 204 respectively.

The present invention, therefore, is well adapted to carry out the objects and attain the ends and advantages mentioned, as well as others inherent therein. While preferred embodiments of the present invention are described for the purpose of disclosure, numerous other changes in the details of construction, arrangement of parts, compositions and materials selection, and processing steps can be carried out without departing from the spirit of the present invention, which is intended to be limited only by the scope of the appended claims.

What is claimed is:

1. A backplane, the backplane having a plurality of hot-plug compatible card slots, the backplane further comprising:
   a hot-plug controller for managing the operation of the backplane;
   a plurality of hot-plug circuits, each hot-plug circuit coupled to one or more of the plurality of card slots for managing the operation of the corresponding card slot; and
   a test connector coupled to the hot-plug controller, the plurality of hot plug circuits and an external tester, wherein the external tester performs analog testing of the plurality of hot-plug circuits via the test connector.

2. The backplane of claim 1, wherein the backplane is a Peripheral Component Interconnect (PCI) backplane.

3. The backplane of claim 2, wherein the PCI backplane complies with the PCI hot-plug 1.0 specification.

4. The backplane of claim 1, wherein a test adapter card is inserted into a card slot selected from the plurality of card slots to enable the analog testing of the hot-plug circuit corresponding to the selected card slot.

5. The backplane of claim 4, wherein the test adapter card also supports digital testing of the selected card slot and its corresponding hot-plug circuit.

6. The backplane of claim 4, wherein a plurality of communication lines couple the external tester to each of the plurality of card slots, and wherein the plurality of communication lines enable the external tester to issue resistive loading requests to one or more test adapter cards inserted within the plurality of card slots.

7. The backplane of claim 6, wherein the plurality of communication lines are existing unutilized bus signal lines.

8. The backplane of claim 1, wherein a reset signal couples the external tester to the hot-plug controller via the test connector, such that when a reset signal is enabled, the hot-plug controller is held in reset, releasing control of the plurality of hot-plug circuits.

9. The backplane of claim 8, wherein a plurality of slot enable signals are coupled from the external tester to each of the plurality of hot-plug circuits via the test connector, thus enabling the external tester to enable/disable each of the hot-plug circuits when the hot-plug controller is in reset.

10. The backplane of claim 1, wherein a plurality of voltage output signals couple each of the plurality of card slots to the external tester, enabling the external tester to detect if a selected card slot has shut down due to a controlled resistive loading supplied by the test adapter card inserted in the selected card slot.

11. The backplane of claim 1, wherein the test adapter card further comprises:
   a resistive load controller which receives a load request from the external tester via one of the plurality of communication lines, and selects a load corresponding to the load request;
   a plurality of switched voltage signals supplied by the hot-plug circuit corresponding to the test adapter card slot, wherein the load selected by the resistive load controller is applied to the plurality of switched voltage signals; and
   a multiplexer coupled to the plurality of switched voltage signals, wherein the multiplexer returns a selected switch voltage signal chosen from the plurality of switched voltage signals to the external tester after the load has been applied by the resistive load controller.

12. A computer system, comprising:
   a computer backplane;
   a plurality of card slots mounted to the computer backplane;
   a plurality of circuit adapter cards inserted within the plurality of card slots;
   a hot-plug controller residing on the computer backplane for managing the operation of the computer backplane;
   a plurality of hot-plug circuits residing on the computer backplane, each of the plurality of hot-plug circuits coupled to at least one of the plurality of card slots for managing the operation of the corresponding card slot; and
   a test connector residing on the computer backplane, the test connector coupled to the hot-plug controller, the plurality of hot-plug circuits and an external tester, wherein the external tester performs analog testing of the plurality of hot-plug circuits via the test connector.

13. The computer system of claim 12, wherein the coupling/decoupling of the circuit adapter cards to the plurality of card slots occurs during normal operation of the computer system without affecting the normal operation of the computer system.

14. The computer system of claim 12, wherein the computer backplane is a Peripheral Component Interconnect (PCI) backplane.

15. The computer system of claim 12, wherein a test adapter card is inserted into a selected card slot of the plurality of card slots, enabling the analog testing of the hot-plug circuit corresponding to the selected card slot.

16. The computer system of claim 15, wherein the test adapter card also supports digital testing of the plurality of card slots and their corresponding hot-plug circuits.

17. A method for testing a plurality of hot-plug circuits on a computer backplane, each of the plurality of hot-plug circuits corresponding to one or more of a plurality of adapter slots on the backplane, wherein one or more hot-plug controller chips manage the operation of the computer backplane, and wherein a test adapter card is inserted into a first selected adapter slot, the method comprising the steps of:

inserting a test adapter card into a first selected adapter slot;

asserting a reset signal on an external tester connected to the first selected adapter slot via a backplane test connector, causing the one or more hot-plug controller chips to be held in reset and releasing control of the plurality of hot-plug circuits; and issuing a command on the external tester to perform a series of resistive loading tests on the first selected adapter slot and associated hot-plug circuit.

18. The method of claim 17, wherein the step of issuing a command on the external tester to perform a series of resistive loading tests on the first selected adapter slot and associated hot-plug circuit further comprises:

issuing a command from the external tester to the test adapter card in the first selected adapter slot to apply a nominal voltage load on a first voltage level;

measuring the first voltage level after the nominal load has been applied, and log an error if the first selected adapter slot shuts down after application of the nominal voltage load on the first voltage level;

issuing a command from the external tester to the test adapter card in the first selected adapter slot to apply an overcurrent voltage load on the first voltage level; and measuring the first voltage level after the overcurrent voltage load has been applied, and log an error if the first selected adapter slot does not shut down after application of the overcurrent voltage load on the first voltage level.

19. The method of claim 18, wherein if the first selected adapter slot shuts down after application of the overcurrent voltage load on the first voltage level, the external tester issues a command to repower the first selected adapter slot prior to the next resistive loading test.

20. The method of claim 18, wherein the steps of applying nominal and overcurrent voltage loads and measuring the results are repeated for all voltage levels for the first selected adapter slot.

21. The method of claim 20, wherein the voltage levels for the selected adapter slot are: +3.3 V., +5 V, +12V and −12V.

22. The method of claim 20, wherein after the steps of applying nominal and overcurrent voltage loads and measuring the results have been repeated for all voltage levels for the first selected adapter slot, the steps are repeated for each of the remaining adapter slots on the computer backplane.

23. The method of claim 22, wherein after the steps of applying nominal and overcurrent voltage loads and measuring the results have been repeated for all voltage levels on each of the adapter slots on the computer backplane, the test adapter performs digital testing on the plurality of adapter slots on the backplane.

24. The method of claim 17, wherein the computer backplane is a Peripheral Component Interconnect (PCI) backplane.

* * * * *